United States Patent
Ikuta et al.

(10) Patent No.: US 8,981,613 B2
(45) Date of Patent: Mar. 17, 2015

(54) ELECTRIC ROTATING MACHINE

(75) Inventors: Hiroyuki Ikuta, Kariya (JP); Masato Yamaji, Kariya (JP)

(73) Assignee: Denso Corporation, Kariya (JP)

( * ) Notice: Subject to any disclaimer, the term of this patent is extended or adjusted under 35 U.S.C. 154(b) by 279 days.

(21) Appl. No.: 13/588,287

(22) Filed: Aug. 17, 2012

(65) Prior Publication Data

US 2013/0049514 A1 Feb. 28, 2013

(30) Foreign Application Priority Data

Aug. 23, 2011 (JP) ................................. 2011-181769

(51) Int. Cl.
*H02K 3/04* (2006.01)
*H02K 3/38* (2006.01)

(52) U.S. Cl.
CPC ........................................ *H02K 3/38* (2013.01)
USPC .......................................... 310/201; 310/43

(58) Field of Classification Search
CPC ......................................................... H02K 3/30
USPC .............................. 310/201, 45, 206, 207, 208
See application file for complete search history.

(56) References Cited

U.S. PATENT DOCUMENTS

| | | | |
|---|---|---|---|
| 6,147,432 A | 11/2000 | Kusase et al. | |
| 6,333,573 B1 | 12/2001 | Nakamura | |
| 6,462,453 B1 * | 10/2002 | Asao et al. | 310/179 |
| 6,501,206 B2 * | 12/2002 | Oohashi et al. | 310/184 |
| 2005/0073209 A1 * | 4/2005 | Koike | 310/201 |

FOREIGN PATENT DOCUMENTS

| | | |
|---|---|---|
| JP | 2000-060051 | 2/2000 |
| JP | 2001-204151 | 7/2001 |
| JP | 2004-048999 | 2/2004 |

OTHER PUBLICATIONS

Office Action (1 page) dated Jul. 25, 2013, issued in corresponding Japanese Application No. 2011-181769 and English translation (1 page).

* cited by examiner

*Primary Examiner* — Hanh Nguyen
(74) *Attorney, Agent, or Firm* — Nixon & Vanderhye P.C.

(57) ABSTRACT

The electric rotating machine includes a stator winding constituted of conductor segments each having a pair of in-slot portions and a coil end section projecting from both axial ends of a stator core. The coil end section includes a joint-side end portion having a skew portion intersecting with another one of the conductor segments at an axial end of the stator core. The skew portion is formed with a joint end portion at an extremity thereof, the joint end portion being formed with a conductor exposed portion where an inner conductor is exposed and joined to a conductor exposed portion of another conductor segment. A joint area between the joint end portions and a vicinity thereof are covered by an insulating resin member. The insulating resin member is thicker at a portion covering the conductor exposed portions than at a portion covering other than the conductor exposed portions.

9 Claims, 10 Drawing Sheets

ELECTRIC ROTATING MACHINE

This application claims priority to Japanese Patent Application No. 2011-181769 filed on Aug. 23, 2011, the entire contents of which are hereby incorporated by reference.

BACKGROUND OF THE INVENTION

1. Field of the Invention

The present invention relates to an electric rotating machine which can be mounted on a vehicle and used as a motor or an alternator.

2. Description of Related Art

Generally, an electric rotating machine mounted on a vehicle to be used as a motor or an alternator includes a rotor and a stator having a stator core disposed facing the rotor and a stator winding wound around the stator core. Each of Japanese Patent Application Laid-open Nos. 2001-204151 and 2000-060051 discloses an electric rotating machine of the segment type in which the stator winding is made up of a plurality of conductor segments including in-slot portions accommodated in slots formed in the stator core and a coil end section exposed from the slots in the axial direction and extending along the circumferential direction.

Each conductor segment is constituted of a pair of straight sections and a turn section connecting one ends of the straight sections and is U-shaped. The insulating films of the straight sections are stripped off at their tips on their open side to form conductor exposed portions. The straight sections of each conductor segment are inserted into two of the slots from one axial end side, the two slots being apart from each other by a predetermined slot pitch. Next, the open end portions of the conductor segment projecting form the slots toward the other axial end side are bent so as to be skewed in the circumferential direction by a predetermined angle. Thereafter, each corresponding two conductor exposed portions are joined by welding or the like so that the conductor segments are electrically connected in series. Finally, the conductor exposed portions and their vicinities are coated with an insulating resin member to complete the stator winding.

Meanwhile, there is a strong demand to reduce the sizes and enhance the performances of electric rotating machines mounted on hybrid vehicles which are becoming widespread. To address such demand, it is necessary to ensure sufficiently high insulating performance of the insulating resin member covering the conductor exposed portions and their vicinities. If the thickness of the insulating resin member is increased for this purpose, the cost of material of the insulating resin member increases.

SUMMARY

An exemplary embodiment provides an electric rotating machine comprising:
a rotor; and
a stator including a stator core disposed facing the rotor and a stator winding wound on the stator core,
wherein
the stator winding includes a plurality of conductor segments each having a first in-slot portion accommodated in one of slots formed in the stator core and a second in-slot portion accommodated in another one of the slots, and a coil end section projecting from both axial ends of the stator core,
the coil end section includes a turn-side end portion connecting the first and second in-slot portions at a first axial end side of the stator core and a joint-side end portion having a skew portion intersecting with another one of the conductor segments at a second axial end of the stator core,
the skew portion is formed with a joint end portion at an extremity thereof, the joint end portion being formed with a conductor exposed portion where an inner conductor is exposed and joined to a conductor exposed portion of the another one of the conductor segments, and
a joint area between the joint end portions whose conductor exposed portions are joined to each other and a vicinity thereof are covered by an insulating resin member,
the insulating resin member being thicker at a portion covering the conductor exposed portions joined to each other than at a portion covering other than the conductor exposed portions joined to each other.

According to the exemplary embodiment, there is provided a high-voltage electric rotating machine having a sufficiently high insulating performance which can be manufactured at low cost.

Other advantages and features of the invention will become apparent from the following description including the drawings and claims.

PREFERRED EMBODIMENTS OF THE INVENTION

First Embodiment

Figure 1:
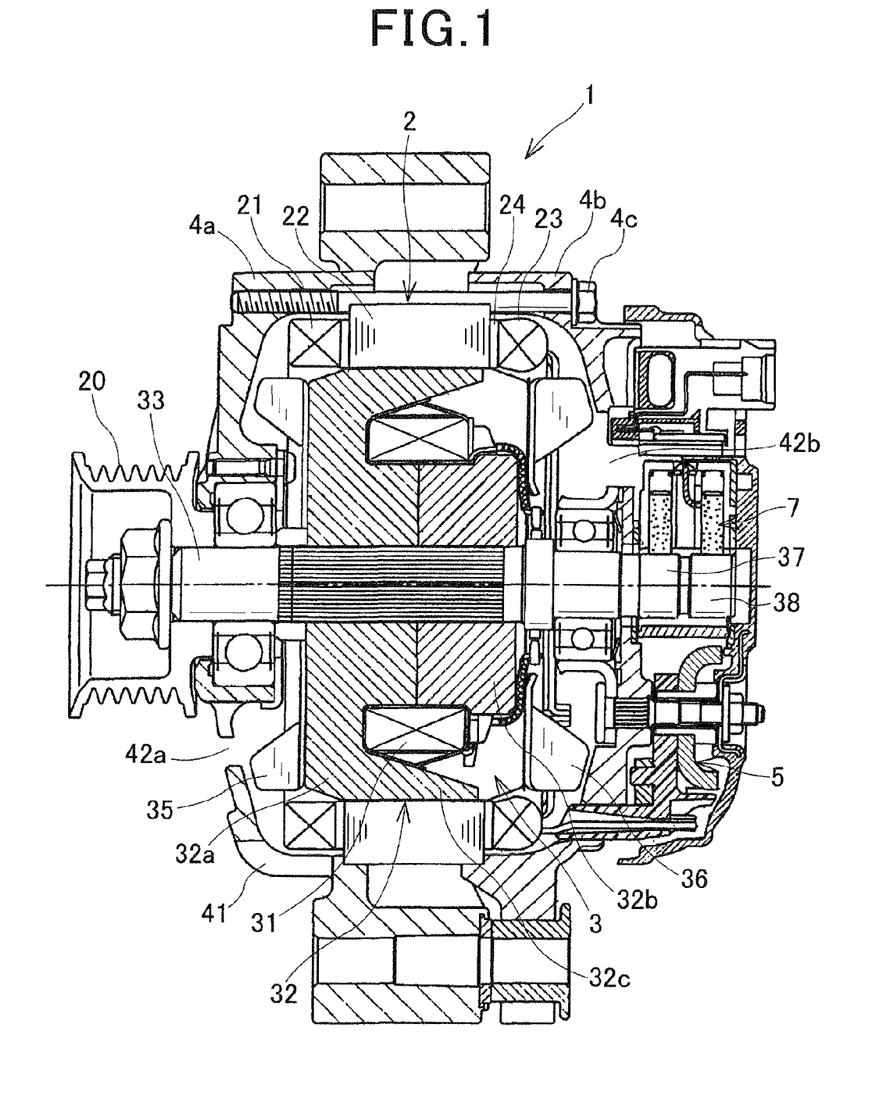
FIG. 1 is an axial cross-sectional view of an electric rotating machine according to a first embodiment of the invention.
Figure 2:
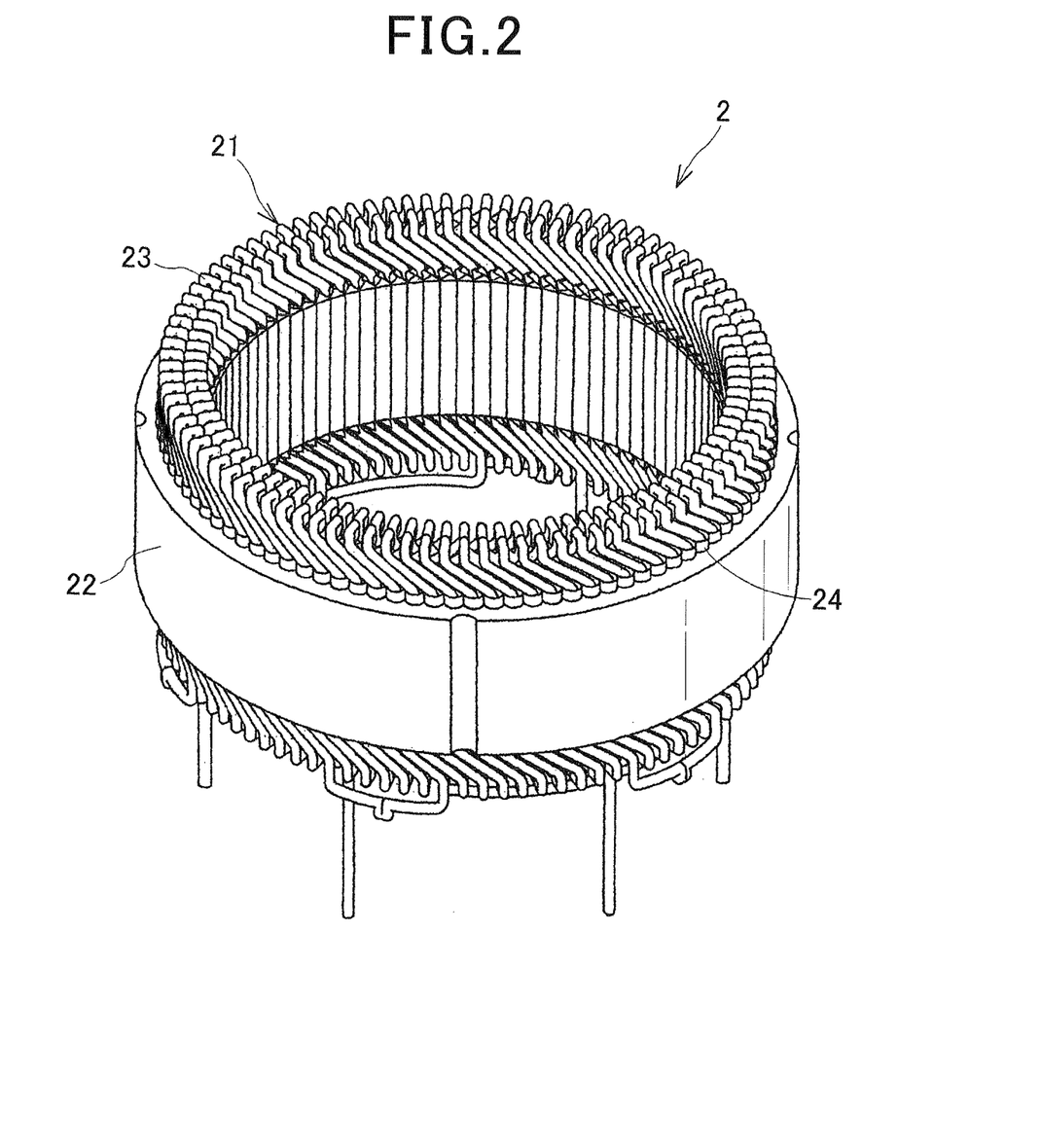
FIG. 2 is an entire perspective view of a stator of the electric rotating machine according to the first embodiment.

FIG. 1 is an axial cross-sectional view of an electric rotating machine 1 according to a first embodiment of the invention. FIG. 2 is an entire perspective view of a stator of the electric rotating machine 1 according to the first embodiment. The electric rotating machine 1 is used as a vehicle-use alternator. The electric rotating machine 1 includes a stator 2 as an armature, a rotor 3 as a field system, front and rear housings 4a and 4b for housing the stator 2 and the rotor 3, and a rectifier 5 for converting AC power into DC power. The front and rear housings 4a and 4b are joined and fixed to each other by fastening bolts 4c.

As shown in FIG. 2, the stator 2 includes a stator core 22, a segment-type stator winding 21 constituted of a plurality of conductor segments 23, and an insulator 24 providing electrical insulation between the stator core 22 and the stator winding 21. The stator 2 is fixed by being held between the front housing 4a and the rear housing 4b so as to be disposed facing the outer periphery of the rotor 3 with a certain clearance. The structure of the stator 2 is explained in detail later.

As shown in FIG. 1, the rotor 3, which rotates together with a shaft 33 rotatably supported by the front housing 41 and the rear housing 4b, includes a Lundell-type pole core 32 and a field winding 31. A pulley 20 is fixed to the front end of the shaft 33. The pulley 20 is coupled to a vehicle engine (not shown) through a belt or the like.

The Lundell-type pole core 32 is constituted of a combination of a front-side pole core 32a and a rear-side pole core 32b. Each of the pole cores 32a and 32b includes six claw-like magnetic pole portions 32c fitted into the shaft 33 such that the field winding 31, which is formed of an insulated copper wire wound cylindrically and concentrically, is sandwiched by the claw-like magnetic pole portions 32c in the front-rear direction. In this embodiment, each of the pole cores 32a and 32b has eight magnetic poles. Accordingly, the rotor 3 has sixteen magnetic poles.

The axial end surface (front end surface) of the front housing 4a is formed with intake holes 42a. The axial end surface (rear end surface) of the rear housing 4a is formed with intake holes 42b. A diagonal flow fan 35 for blowing cooling air taken from the intake holes 42a in the axial and radial directions is fixed to the front end surface of the front-side pole core 32a by welding or the like. A diagonal flow fan 36 for blowing cooling air taken from the intake holes 42b in the radial direction is fixed to the rear end surface of the rear-side pole core 32b by welding or the like. Each of the front housing 4a and the rear housing 4b is formed with discharge holes 41 for discharging the cooling air at portions facing the coil end section of the stator winding 21 respectively projecting from the axial ends of the stator core 22.

The shaft 33 is provided with slip rings 37 and 38 at portions near the rear end thereof. The slip rings 37 and 38 are electrically connected to the ends of the field coil 31 so that the field coil 31 can be supplied with a current from a brush device 7.

The electric rotating machine 1 having the structure described above operates such that the rotor 3 rotates together with the shaft 33 when torque generated by the engine is transmitted to the pulley 20 through a belt or the like. By applying an excitation voltage from the brush device 7 to the field winding 31 of the rotor 3 through the slip rings 37 and 38 in this state, the claw-like magnetic pole portions 32c of the pole cores 32a and 32b are excited, and N and S poles are formed so as to alternate with each other along the rotational direction of the rotor 3. As a result, a three-phase AC voltage is induced in the stator winding 21, and a DC voltage is taken from the output terminals of the rectifier 5.

Figure 3:
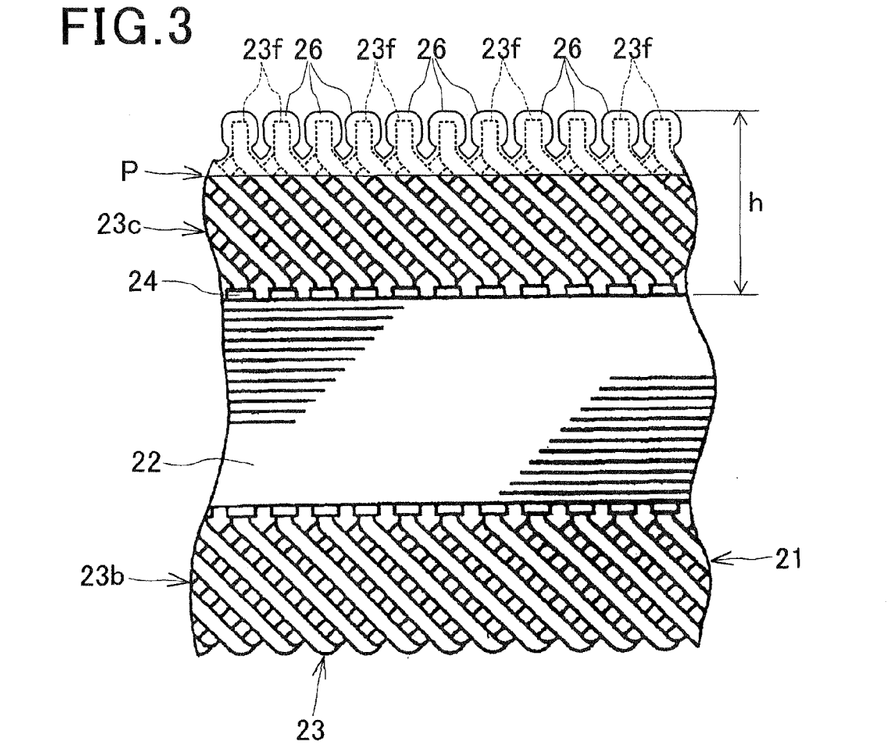
FIG. 3 is a partial side view of the stator of the electric rotating machine according to the first embodiment.
Figure 4:
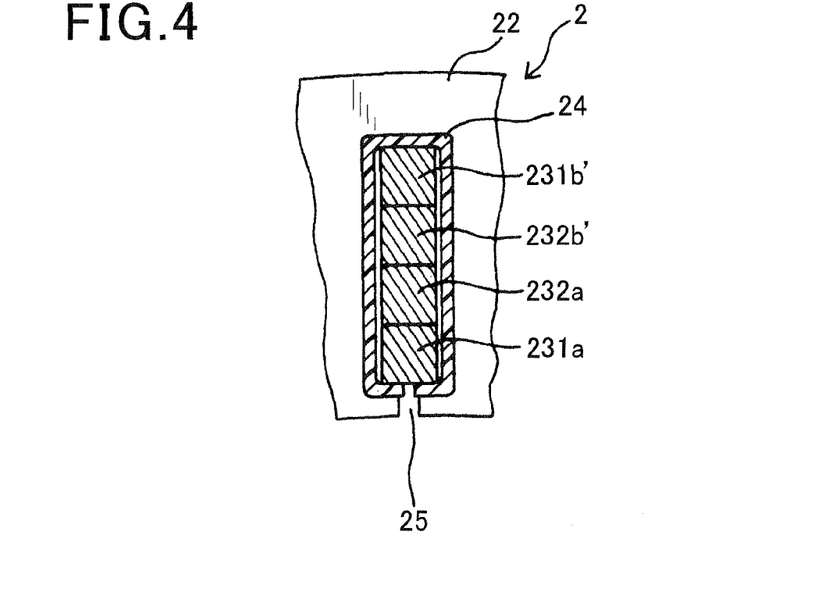
FIG. 4 is a partial cross-sectional view of the stator of the electric rotating machine according to the first embodiment.
Figure 5:
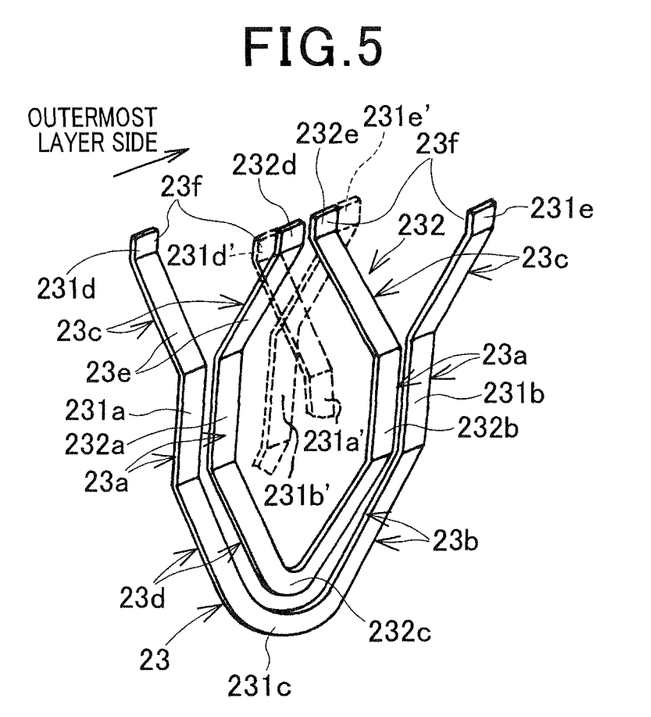
FIG. 5 is a schematic perspective view of conductor segments used in the electric rotating machine according to the first embodiment.
Figure 6:
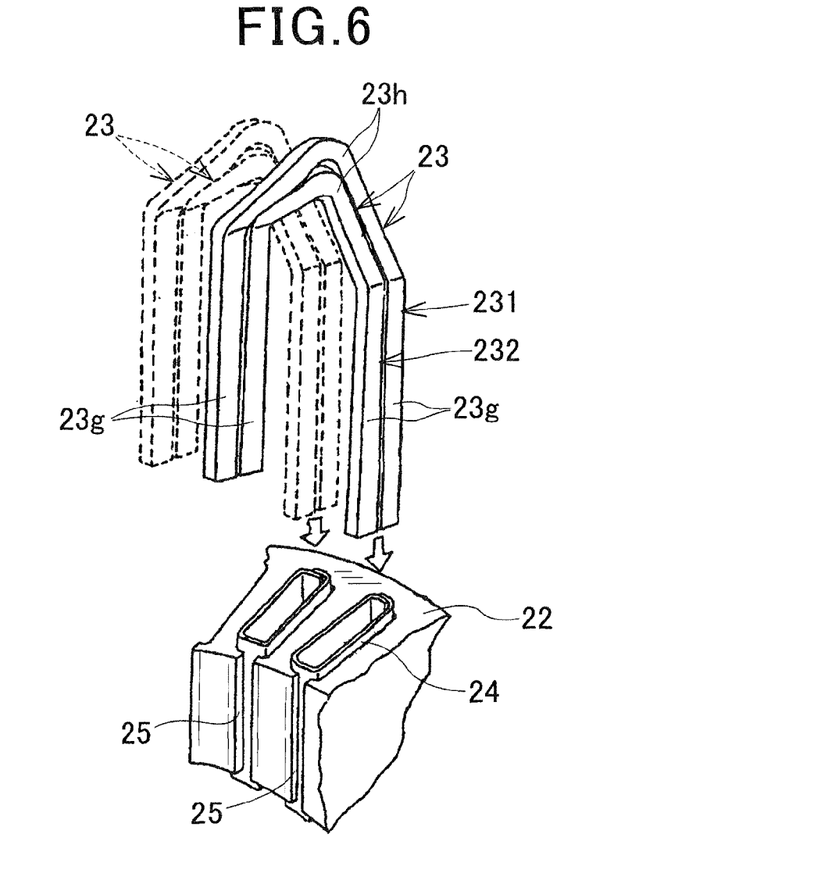
FIG. 6 is an explanatory view showing how the conductor segments are inserted into slots of a stator core of the stator of the electric rotating machine according to the first embodiment.
Figure 7:
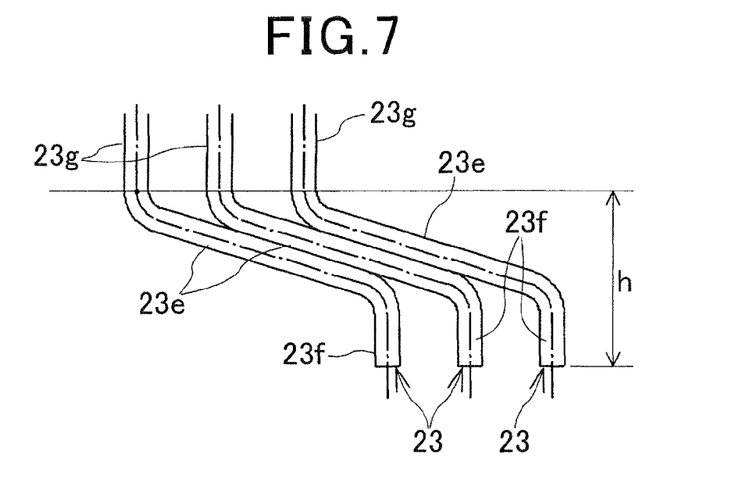
FIG. 7 is an explanatory view showing arrangement of the conductor segments disposed in the outermost layer of the joint-side end portion of the stator of the electric rotating machine according to the first embodiment.
Figure 8:
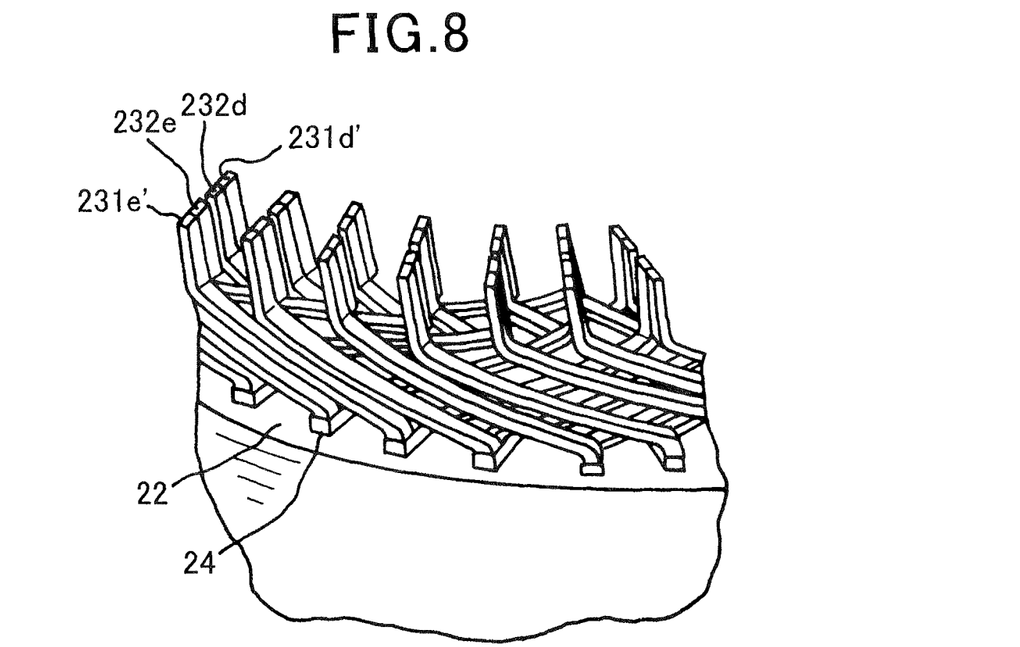
FIG. 8 is a perspective view showing part of the joint-side end portion of the stator of the electric rotating machine according to the first embodiment.
Figure 9:
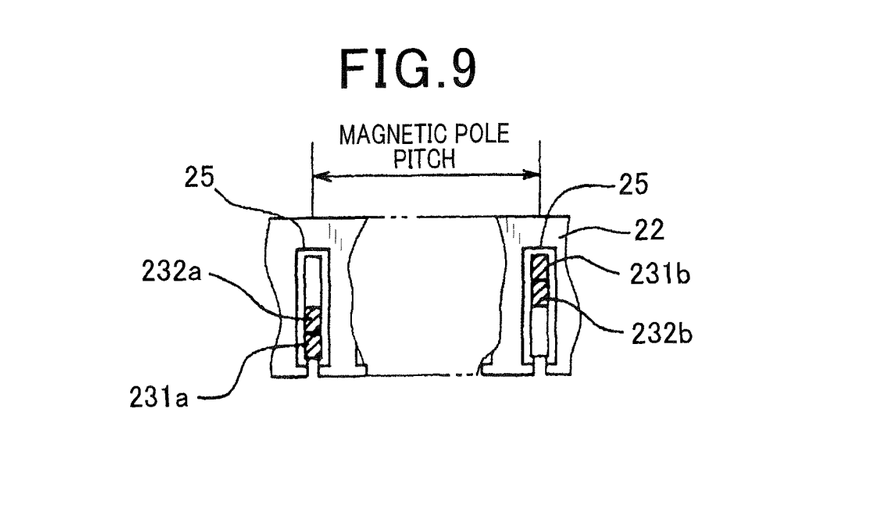
FIG. 9 is a partial cross-sectional view of the stator for explaining how the conductor segments are accommodated in the slot of the stator core of the stator of the electric rotating machine according to the first embodiment.

Next, the structure of the stator 2 is explained in detail. FIG. 3 is a partial side view of the stator 2 of this embodiment. FIG. 4 is a partial cross-sectional view of the stator 2 of this embodiment. FIG. 5 is a schematic perspective view of the conductor segments used in the stator of this embodiment. FIG. 6 is an explanatory view showing how the conductor segments are inserted into slots formed in the stator core 22 of the stator 2 of this embodiment. FIG. 7 is an explanatory view showing arrangement of the conductor segments disposed in the outermost layer of the joint-side end portion of the stator 2 of this embodiment. FIG. 8 is a perspective view showing part of the joint-side end portion of the stator 2 of this embodiment. FIG. 9 is a partial cross-sectional view of the stator 2 for explaining how the conductor segments are accommodated in the slots of the stator core 22 of the stator 2 of this embodiment.

In the following description, the words "axial direction" means the axial direction of the stator core 22, the words "radial direction" means the radial direction of the stator core 22, and the words "circumferential direction" means the circumferential direction of the stator core 22.

The stator core 22 is formed with the slots 25 having a rectangular cross portion for holding the three-phase stator winding 21. In this embodiment, the stator core 22 is formed with the evenly spaced ninety six slots 25 so that two sets of the three-phase stator windings 21 can be held for the rotor 3 having the sixteen magnetic poles.

Each stator winding 21 is constituted of a plurality of U-shaped conductor segments 23 each having a joint end portion 23f joined to that of a corresponding one of the conductor segments 23. The conductor segment 23 is coated with an insulating film 23d at its outer surface, and has conductor exposed portions 23i at its both ends where the insulating film 23d is stripped off to expose the inner conductor.

As shown in FIG. 6, the conductor segment 23 is constituted of a pair of straight sections 23g and a turn section 23h connecting one ends of the straight sections 23g, and accordingly has a U-shape. The two straight sections 23g of the U-shaped conductor segment 23 are inserted into the two slots 25 apart from each other by a predetermined slot pitch. Thereafter, the open end portions of the straight sections 23g projecting outward from the slots 25 are bent so that the open end portions are skewed in the circumferential direction by a predetermined angle.

Accordingly, as shown in FIG. 5, the conductor segment 23 includes a pair of in-slot portions 23a and 23b accommodated in the two slots 25 and extending linearly in the axial direction, and a coil end section projecting from the slots 25 and extending in the circumferential direction. The coil end section is constituted of a turn-side end portion 23*b* and a pair of joint-side end portions 23*c*. The turn-side end portion 23*b* is formed integrally with the in-slot portions 23*a* and 23*b* so as to connect one ends of the in-slot portions 23*a* and 23*b*, and project from one axial end side (the rear side of the electric rotating machine 1 or the right side in FIG. 1, referred to as "the first axial end side" hereinafter) of the slots 25. The joint-side end portions 23*c* are formed in the other ends of the in-slot portions 23*a* so as to project from the other axial end side (the front side of the electric rotating machine 1 or the left side in FIG. 1, referred to as "the second axial end side" hereinafter) of the slots 25.

The turn-side end portion 23*b* includes a V-shaped turn section 23*h* at its tip formed by being bent. The joint-side end portion 23*c* includes a joint-side skew portion 23*e* and a joint end portion 23*f*. The joint-side skew portion 23*e* formed by being bent to be skewed with respect to the axial end surface of the stator core 22 by a predetermined angle. The joint end portion 23*f* is formed integrally in the end of the joint-side skew portion 23*e* by being bent. The insulating film 23*d* of the joint end portion 23*f* is stripped off to form a conductor exposed portion 23*i* where the inner conductor is exposed.

The joint-side skew portions 23*e* are subjected to pressure treatment. Accordingly, the hardness of the joint-side skew portion 23*e* is higher than that of the straight section 23*g*. Therefore, since the joint-side skew portions 23*e* are hard to be deformed, they maintain the linear shape as shown in FIG. 7. This makes it possible to reduce the inter-coil clearance (clearance between the adjacent conductor segments) at the joint-side skew portions 23*e*. Accordingly, since the contact area between the coils (between the adjacent conductor segments) can be increased, the height of the joint-side skew portions 23*e*, that is, the height h of the coil end section can be reduced.

Each slot 25 accommodates an even number of (four in this embodiment) conductors (the in-slot portions 23 of the conductor segments 23). As shown in FIG. 4, the four conductors accommodated in the same slot 25 are disposed in the order of the inner most layer, the inner middle layer, the outer middle layer and the outermost layer toward radially outward of the stator core 22. The four conductors accommodated in the same slot 25 form the same phase of the stator winding 21.

A plurality of sets of the four conductors accommodated in the different slots 25 are connected to one another in a predetermined pattern to form the stator winding 21. In this embodiment, the conductors in the same slot 25 are electrically connected to one another by way of the turn sections 23*h* at the turn-side end portions 23*b* on the first axial end side, and by arc-welding the joint end portions 23*f* to one another at the joint-side end portions 23*c* on the second axial end side. That is, a first coil end group is formed by a plurality of the turn sections 23*h* projecting from the slots 25 on the first axial end side of the stator core 22, and a second coil end group is formed by a plurality of the joint-side end portions 23*c* projecting from the slots 25 on the second axial end side of the stator core 22 (see FIG. 8).

One of the conductors (in-slot portions 23) accommodated in the same slot 25 is paired with one of the conductors accommodated in the slot 25 apart from this same slot 25 by a predetermined magnetic pole pitch.

For example, as shown in FIG. 9, the conductor 231*a* disposed in the innermost layer of one slot 25 is paired with the conductor 231*b* disposed in the outermost layer of the slot 25 apart from this one slot 25 by one magnetic pole pitch (NS magnetic pole pitch) in the clockwise direction of the stator core 22. Likewise, the conductor 232*a* disposed in the inner middle layer of one slot 25 is paired with the conductor 232*b* disposed in the outer middle layer 232*b* apart from this one slot 25 by one magnetic pole pitch in the clockwise direction of the stator core 22. At the turn-side end portion 23*b* on the first axial end side of the stator core 22, the former paired conductors (the conductor 231*a* in the innermost layer and the conductor 231*b* in the outermost layer) are connected to each other by way of the turn section 23*h* (231*c*), and the latter paired conductors (the conductor 232*a* in the inner middle layer and the conductor 232*b* in the outer middle layer) are connected to each other by way of the turn section 23*h* (232*c*).

Accordingly, at the first axial end side of the stator core 22, the turn section 23*h* (232*c*) connecting the conductor 232*a* in the inner middle layer and the conductor 232*b* disposed in the outer middle layer is surrounded by the turn section 23*h* (231*c*) connecting the conductor 231*a* in the innermost layer and the conductor 231*b* in the outermost layer. In this way, at the first axial end side of the stator core 22, the turn section 23*h* (232*c*) as a connecting section for one paired conductors accommodated in the two slots 25 is surrounded by the turn section 23*h* (231*c*) as a connecting section for another paired conductors accommodated in the same two slots 25. Further, an intermediate-layer coil end is formed by the turn section 23*h* (232*c*) connecting the conductor 232*a* in the inner middle layer and the conductor 232*b* in the outer middle layer, and an end-layer coil end is formed by the turn section 23*h* (231*c*) connecting the conductor 231*a* in the innermost layer and the conductor 231*b* in the outermost layer.

On the other hand, the conductor 232*a* in the inner middle layer of the one slot 25 is also paired with the conductor 231*a'* disposed in the innermost layer of the slot 25 apart from this one slot 25 by one magnetic pole pitch in the clockwise direction of the stator core 22. Likewise, the conductor 231*b'* in the outermost layer of this one slot 25 is also paired with the conductor 232*b* disposed in the outer middle layer of the slot 25 apart from this one slot 25 by one magnetic pole pitch in the clockwise direction of the stator core 22. The paired conductors at the joint-side end portion 23*c* on the second axial end side of the stator core 22, that is, the conductor 232*a* in the inner middle layer and the conductor 231*a'* in the innermost layer 231*a'* are connected to each other through a joint between the joint end portions 23*f* (232*d* and 231*d'*). Likewise, the conductor 231*b'* in the outermost layer and the conductor 232*b* in the outer middle layer 232*b* are connected to each other through a joint between the joint end portions 23*f* (231*e'* and 232*e*).

Accordingly, at the second axial end side of the stator core 22, an inner joint portion (constituted of the joint end portions 232*d* and 231*d'*) for connection between the conductor 232*a* in the inner middle layer and the conductor 231*a* in the innermost layer, and an outer joint portion (constituted of the joint end portions 231*e'* and 232*e*) for connection between the conductor 231*b'* in the outermost layer and the conductor 232*b* in the outer middle layer are disposed in a state of being shifted from each other in the radial direction and the circumferential direction. Further, the inner joint portion and the outer joint portion form two adjacent-layer coil ends located on different concentric circles.

The conductor exposed portions 23*i* and their vicinities of the outer and inner joint portions are coated with the insulating resin member 26 for insulation and retention of these joint portions. The insulating resin material 26 is explained later in detail.

As shown in FIG. 4, the conductor 231*a* in the innermost layer and the conductor 231*b'* in the outermost layer are provided by a large segment 231 (see FIG. 6) formed by shaping an electrical conductive member into a U-shape. Likewise, the conductor 232a in the inner middle layer and the conductor 232b' in the outer middle layer are provided by a small segment 232 (see FIG. 6) formed by shaping an electrical conductive member into a U-shape. The U-shaped conductor segment 23 as a basic conductor is constituted of the large segment 231 and the small segment 232 for each slot 25.

For each phase of the stator winding 21, a winding (coil) wound two-fold around the stator core 22 is formed by the basic segments 23. However, the segment integrally including an output lead and a neutral lead, and the segment including the turn section 23h for connection between the first fold and the second fold are formed by a deformed segment different from the basic segment 23. The winding ends of the respective phase of the stator winding 21 are star-connected using these deformed segments.

Figure 10:
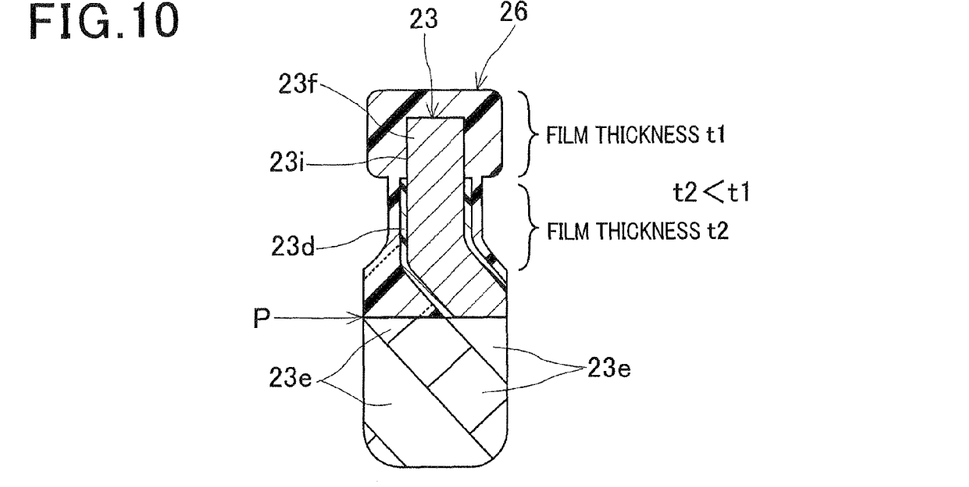
FIG. 10 is a partial cross-sectional view showing a joint area of the adjacent conductor segments and its vicinity of the stator of the electric rotating machine according to the first embodiment.
Figure 11:
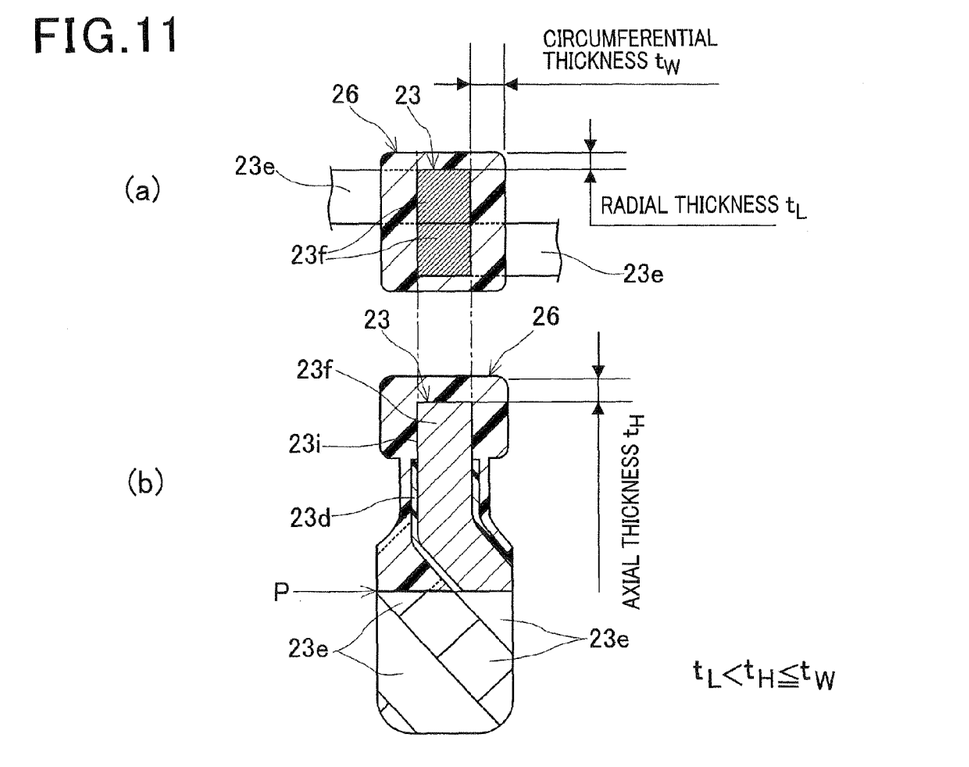
FIG. 11 is a diagram showing the thickness of an insulating resin member covering the conductor exposed portion of the conductor segment of the stator of the electric rotating machine according to the first embodiment, the diagram showing a cross section of the conductor segment in the direction perpendicular to the axial direction (a) and in the axial direction (b)
Figure 12:
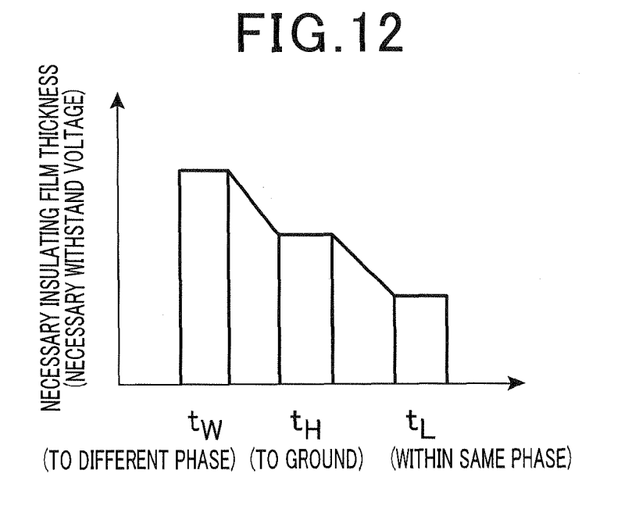
FIG. 12 is a graph showing the relationships between the thickness of the conductor segment in different directions (tH, tL and tW) and the necessary insulating film thickness (necessary withstand voltage)
Figure 13:
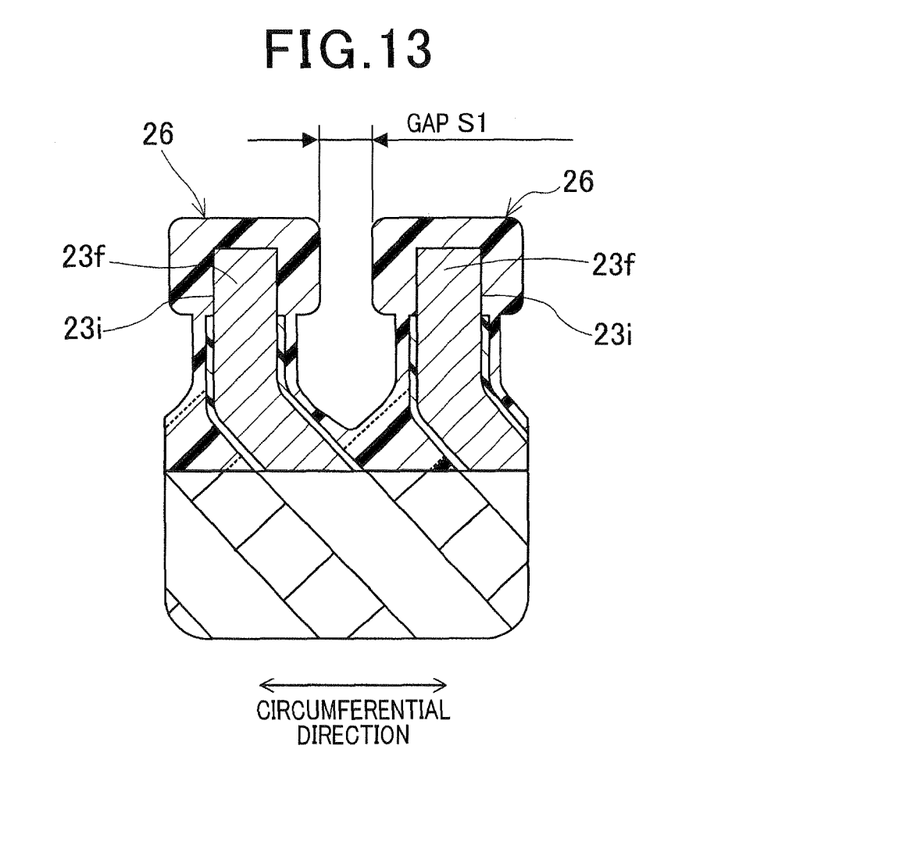
FIG. 13 is a partial cross-sectional view showing joint areas of the conductor segments adjacent in the circumferential direction of the stator of the electric rotating machine according to the first embodiment.
Figure 14:
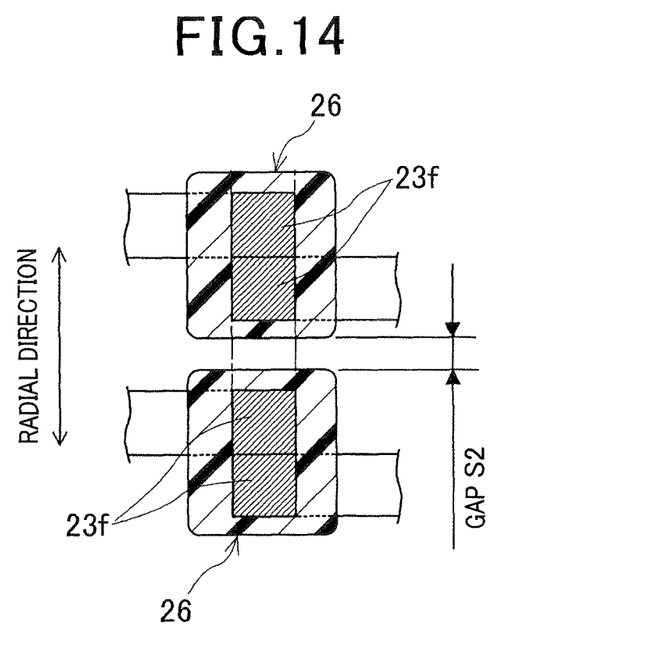
FIG. 14 is a partial cross-sectional view showing joint areas of the conductor segments adjacent in the radial direction of the stator of the electric rotating machine according to the first embodiment.

Next, the insulating resin member 26 is explained in detail. FIG. 10 is a partial cross-sectional view showing a joint area and its vicinity of the conductor segments of the stator of the electric rotating machine according to the first embodiment. FIG. 11 is a diagram showing the thickness of the insulating resin member covering the conductor exposed portion of the conductor segment of the stator of the electric rotating machine according to the first embodiment, the diagram showing a cross section of the conductor segment in the direction perpendicular to the axial direction (a) and in the axial direction (b). FIG. 12 is a graph showing the relationships between the thickness of the conductor segment in different directions (tH, tL and tW) and the necessary insulating film thickness (necessary withstand voltage). FIG. 13 is a partial cross-sectional view showing joint areas of the conductor segments adjacent in the circumferential direction. FIG. 14 is a partial cross-sectional view showing joint areas of the conductor segments adjacent in the radial direction.

As shown in FIG. 10, the joint end portion 23f of the joint-side end portion 23c of the conductor segment 23 is formed as the conductor exposed portion 23i where the insulating film 23d is stripped off to expose the inner conductor. The conductor exposed portion 23i and its vicinity are coated with the insulating resin member 26 so as to cover an area ranging from the end of the joint end portion 23f of the conductor segment to a position P where the joint-side skew portions 23e starts to intersect with each other. The insulating resin member 26 is formed such that the film thickness t1 at a portion thereof covering the conductor exposed portion 23i is larger than the film thickness t3 at the other portion thereof. This enables providing a high-voltage electric rotating machine having high insulation performance.

As shown in the sections (a) and (b) of FIG. 11, the insulating resin member 26 covering the conductor exposed portion 23i is formed satisfying the condition of tL<tH≤tW where tW is the thickness in the circumferential direction, tL is the thickness in the radial direction and tH is the thickness in the axial direction, so that the insulating performance of the insulating resin member 26 covering the conductor exposed portion 23i becomes optimum. In this embodiment, since the stator winding 21 is a three-phase winding, the thickness tW in the circumferential direction is a necessary insulating-film-thickness (corresponding to necessary withstand voltage) between any two of the U, V and W phases, the thickness tL in the radial direction is a necessary insulating-film-thickness within any one of the U, V and W phases, and the thickness tH in the axial direction is a necessary insulating-film-thickness to the ground (frame or the like). As shown in FIG. 12, the voltage difference between different phases is large, the voltage difference within the same phase is small, and the voltage to the ground is in between these voltage differences. Accordingly, by forming the insulating resin member 26 covering the conductor exposed portion 23i so as to satisfy the condition of tL<tH≤tW, it is possible to obtain the optimum performance of the insulating resin member 26.

Between the adjacent insulating resin members 26 covering the joint areas of the joint end portions 23f of the adjacent conductor segments 23, gaps S1 and S2 are provided. In this embodiment, the gap S1 is provided between the insulating resin members 26 covering the joint areas adjacent in the circumferential direction as shown in FIG. 13, and the gap 52 is provided between the insulating resin members 26 covering the joint areas adjacent in the radial direction as shown in FIG. 14. Each of these gaps S1 and s2 is located facing the conductor exposed portion 23i in the direction in which the conductor segment extends. These gaps S1 and S2 serve as a countermeasure against pinholes present in the insulating resin member 26 for ensuring the insulating performance further reliably.

In this embodiment, the insulating resin member 26 is liquid resin consisting primarily of resin selected from epoxy resin and polyester resin. The insulating resin member 26 is formed by adhering the liquid resin to the conductor exposed portion 23i and its vicinity of the conductor segment 23, and hardening the adhered liquid resin.

According to the first embodiment described above, since the insulating resin member 26 is formed such that the film thickness at the portion thereof covering the conductor exposed portion 23i of the conductor segment 23 is larger than the film thickness at the portion thereof covering the other portion of the conductor segment 23, a high-voltage electric rotating machine having high insulation performance can be provided. Further, since an amount of resin material for the insulating resin member 26 covering other than the conductor exposed portion 23i can be reduced to a minimum, it is possible to reduce the material cost.

In this embodiment, the insulating resin member 26 covering the conductor exposed portion 23i is formed satisfying the condition of tL<tH≤tW where tW is the thickness in the circumferential direction, tL is the thickness in the radial direction and tH is the thickness in the axial direction. This makes it possible that the insulating performance of the insulating resin member 26 covering the conductor exposed portion 23i becomes optimum.

In this embodiment, the gaps S1 and S2 are provided between the insulating resin members 26 covering the adjacent joint end portions 23f. By the provision of the gaps S1 and S2, the necessary insulating performance can be ensured while ensuring the necessary thickness of the insulating resin member 26 covering the conductor exposed portion 23i of the conductor segment 23.

In this embodiment, the gaps S1 and S2 are disposed between the insulating resin members 26 covering at least the joint end positions 23f adjacent in the circumferential direction. Accordingly, since the voltage difference in the stator winding 2 becomes largest between any two of the U-phase, V-phase and W-phase, it is possible to ensure the necessary insulating performance by the provision of the gap S1 between the joint end portions 23f adjacent in the circumferential direction.

In this embodiment, the gaps S1 and S2 are disposed throughout the space facing the conductor exposed portion 23i in the direction in which the conductor segment extends. This ensures the necessary insulating performance.

Second Embodiment

Figure 15:
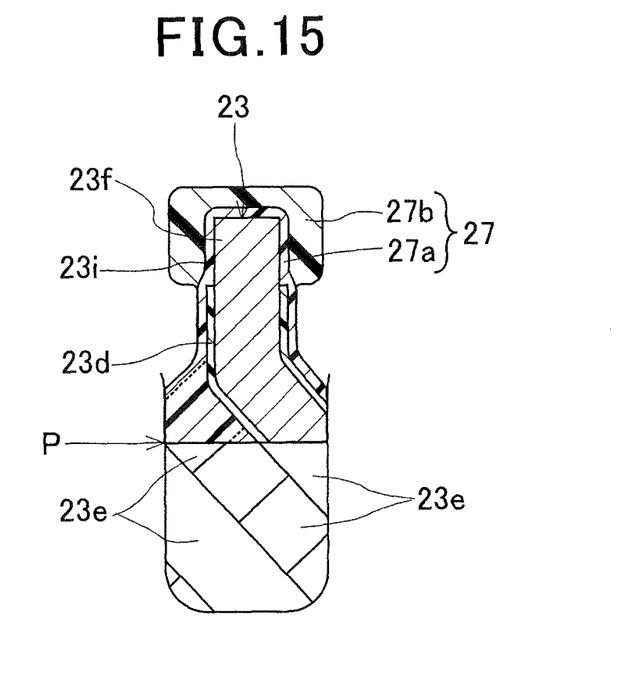
FIG. 15 is a partial cross-sectional view showing a joint area and its vicinity of the conductor segments of a stator of an electric rotating machine according to a second embodiment of the invention.

FIG. 15 is a partial cross-sectional view showing a joint area of the conductor segments and its vicinity of the stator of an electric rotating machine according to a second embodiment of the invention. The basic structure of the electric rotating machine according to the second embodiment is the same as that of the electric rotating machine according to the first embodiment. The second embodiment differs from the first embodiment only in that an insulating resin member 27 covering the conductor exposed portion 23i and its vicinity is formed to have a multilayered structure. Accordingly, the following description of the second embodiment focuses on the difference with the first embodiment, and the members or parts which are the same as those in the first embodiment are reference by the same reference numerals or characters, and explanations thereof are omitted.

As shown in FIG. 15, in the second embodiment, the insulating resin member 27 has a two-layer structure composed of a first layer 27a and a second layer 27b. The first layer 27a is adhered so as to cover the area ranging from the extremity of the joint end portion 23f of the conductor segment 23 to the position P where the joint-side skew portions 23e starts to intersect with each other. The second layer 27b is adhered so as to cover the surface of the first layer 27a covering the conductor exposed portion 23i. That is, the insulating resin member 27 has the two-layer structure where the portion covering the conductor exposed portion 23i is composed of the first layer 27a and the second layer 27b.

Each of the first and second layers 27a and 27b has a nearly constant thickness. The thickness of the second layer 27b is larger than that of the first layer 27a. Accordingly, in this embodiment, like in the first embodiment, the insulating resin member 27 at the portion covering the conductor exposed portion 23i (the portion composed of the first and second layers 27a and 27b) is thicker than at the other portion (the portion composed of the first layer 27a).

In this embodiment, like in the first embodiment, the insulating resin member 27 is formed satisfying the condition of $tL<tH \leq tW$ where tW is the thickness in the circumferential direction, tL is the thickness in the radial direction and tH is the thickness in the axial direction (see FIGS. 11A and 11B).

In this embodiment, like in the first embodiment, the gap S1 is provided between the insulating resin members 27 covering the joint end portions 23f adjacent in the circumferential direction (see FIG. 13), and the gap S2 is provided between the insulating resin members 27 covering the joint end portions 23f adjacent in the radial direction (see FIG. 14).

The first and second layers 27a and 27b are formed by adhering the liquid resin consisting primarily of resin selected from epoxy resin and polyester resin to the surface of a predetermined portion of the conductor segment 23, and then hardening the adhered liquid resin. By using liquid resin having higher viscosity for the first layer 27a and using liquid resin having lower viscosity for the second layer 27b at this time, the above described shape and structure of the insulating resin member 27 can be attained with ease.

According to the second embodiment described above, since the insulating resin member 27 is thicker at the portion covering the conductor exposed portion 23i than at the other portion, the advantages provided by the first embodiment including that a high-voltage electric rotating machine having high insulation performance can be provided at a low manufacturing cost can be also obtained.

Further, according to the second embodiment, since the insulating resin member 27 is formed so as to have the multilayer structure, it is easy to make a difference between the thickness of the insulating resin member 27 at the portion covering the conductor exposed portion 23i (the first and second layers 27a and 27b) and the thickness of the insulating resin member 27 at the portion covering other than the conductor exposed portion 23i (the first layer 27a). Hence, according to the second embodiment, it is easy to form the insulating resin member 27 which is thicker at the portion covering the conductor exposed portion 23i than at the other portion. Further, since the insulating resin member 27 covering the conductor exposed portion 23i has the multilayer structure, the probability of some pinholes being present in each layer and communicating with one another is low. Accordingly, according to the second embodiment, the insulating performance of the insulating resin member can be ensured more reliably than the first embodiment in which the insulating resin member has the single-layer structure.

Other Embodiments

It is a matter of course that various modifications can be made to the above embodiments as described below.

In the first and second embodiments, liquid resin is used as the insulating resin member 26 or 27. However, powder resin may be used as the insulating resin member 26 or 27. In this case, powder resin is adhered to the surface of a predetermined portion of the conductor segment 23, and then hardened to form the insulating resin member 26 or 27.

Figure 16:
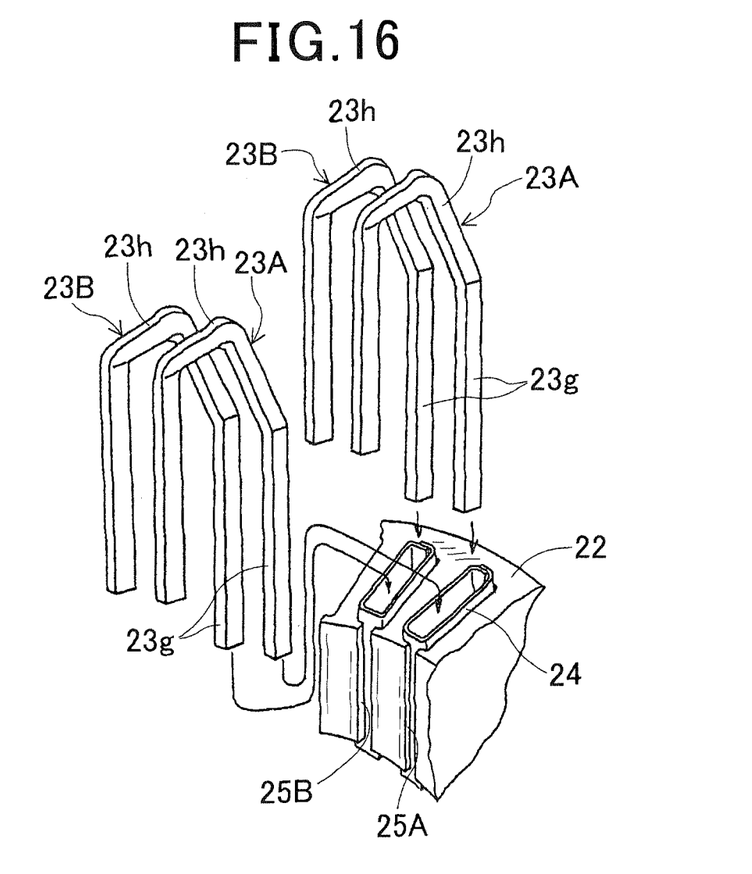
FIG. 16 is an explanatory view showing how the conductor segments are inserted into the slots of the stator core of the stator of a modification of the electric rotating machine according to the first or second embodiment.

In the first and second embodiments, a combination of the large segment 231 and the small segment 232 is used as the basic conductor segment 23 having a U-shape as shown in FIG. 5. However, as the basic conductor segment 23, a combination of two conductor segments 23A and 23B having the same shape as shown in FIG. 16 may be used.

In this case, the two conductor segments 23A and 23B are accommodated in not the same slot 25 but adjacent two slots 25A and 25B, respectively at their straight sections 23g. More specifically, in this case, one of the straight sections 23g of the conductor segment 23A is inserted into the outermost layer of one of the slot 25A, and the other straight section 23g is inserted into the outer middle layer of the slot (not shown) apart from the slot 25A by one magnetic pole pitch in the counter clockwise direction of the stator core 22.

On the other hand, one of the straight sections 23g of the conductor segment 23B is inserted into the outermost layer of the slot 25B adjacent to the slot 25A, and the other straight section 23g is inserted into the outer middle layer of the slot (not shown) apart from the slot 2B by one magnetic pole pitch in the counter clockwise direction of the stator core 22. That is, the two conductor segments 23A and 23B are disposed spaced from each other by one magnetic pole pitch in the circumferential direction. Accordingly, since the turn section 23h of the conductor segment 23A and the turn section 23h of the conductor segment 23B do not intersect with each other at their center portions projecting most axially outward, the projection height of the turn sections 23h from the end surface of the stator core 22 can be reduced.

Also in this case, an even number of (four in this case) straight sections 23g are accommodated in each slot so as to be arranged in a row in the radial direction. Like in the first and second embodiments, the open end portions of the straight sections projecting from the slots 25 are bent to form the joint-side skew portions 23e having an S-shape skewing in the circumferential direction by a predetermined angle. The open end portions of the respective corresponding conductor segments are connected by welding or the like to form the stator winding 21.

Each of the embodiments 1 and 2 described above is directed to a stator of a vehicle alternator. However, it should be noted that the present invention is applicable to a stator of an electric rotating machine mounted on a vehicle as an alternator, motor, or an electric rotating machine capable of operating both an alternator and a motor. The present invention can be used not only for a vehicle-use alternator but a general-purpose electric rotating machine having an air cooling structure such as an electric motor.

The above explained preferred embodiments are exemplary of the invention of the present application which is described solely by the claims appended below. It should be understood that modifications of the preferred embodiments may be made as would occur to one of skill in the art.

What is claimed is:

1. An electric rotating machine comprising:
a rotor; and
a stator including a stator core disposed facing the rotor and a stator winding wound on the stator core,
wherein
the stator winding is formed of a plurality of conductor segments having in-slot portions accommodated in slots of the stator core and a coil end section projecting axially from the slots and extending circumferentially,
the conductor segment includes a turn portion, a skew portion intersecting with other conductor segments at the coil end section and an extreme portion at an extremity of the skew portion,
the coil end section includes a joint end portion at which conductor exposed portions at the extremities of the plurality of the conductor segments are connected together and other portions other than the joint end portion,
the conductor exposed portions including a joint portion at which the joint end portions are joined together and the other portions close thereto are covered by an insulating resin member,
the insulating resin member covering the conductor exposed portions is thicker than the insulating resin member covering the other portions,
the insulating resin member having a first surface that contacts the coil end section and a second surface that does not contact the coil end surface, and
a step is provided between the insulating resin member covering the conductor exposed portions and the insulating resin member covering the other portions, the step being formed on the second surface of the insulating resin member, such that the step does not contact the coil end surface.

2. The electric rotating machine according to claim 1, wherein the insulating resin member covering the conductor exposed portions is set to satisfy a condition of $tL<tH \leq tW$, where tW is a circumferential thickness, tL is a radial thickness and tH is an axial thickness.

3. The electric rotating machine according to claim 1, wherein a gap is provided between the insulating resin members respectively covering the joint portions adjacent to each other.

4. The electric rotating machine according to claim 3, wherein the gap is provided between the insulating resin members respectively covering the joint portions at least circumferentially adjacent to each other.

5. The electric rotating machine according to claim 3, wherein the gap is provided in an area corresponding to the conductor exposed portions in a direction in which the conductor segments extend.

6. The electric rotating machine according to claim 1, wherein the insulating resin member is formed in multi-layer structure.

7. The electric rotating machine according to claim 6, wherein the insulating resin member covering the conductor exposed portions is formed in multi-layer structure.

8. The electric rotating machine according to claim 1, wherein the conductor segment is coated with an insulating film at the other portions of the coil end section that are close to the conductor exposed portions, such that the conductor exposed portions exist where the insulating film does not coat the conductor.

9. An electric rotating machine comprising:
a rotor; and
a stator including a stator core disposed facing the rotor and a stator winding wound on the stator core,
wherein
the stator winding is formed of a plurality of conductor segments having in-slot portions accommodated in slots of the stator core and a coil end section projecting axially from the slots and extending circumferentially,
the conductor segment includes a turn portion, a skew portion intersecting with other conductor segments at the coil end section and an extreme portion at an extremity of the skew portion,
the coil end section includes a joint end portion at which conductor exposed portions at the extremities of the plurality of the conductor segments are connected together and other portions other than the joint end portion,
the conductor exposed portions including a joint portion at which the joint end portions are joined together and the other portions close thereto are covered by an insulating resin member,
the insulating resin member covering the conductor exposed portions is thicker than the insulating resin member covering the other portions,
a step is provided between the insulating resin member covering the conductor exposed portions and the insulating resin member covering the other portions, and
the insulating resin member covering the conductor exposed portions is set to satisfy a condition of $tL<tH \leq tW$, where tW is a circumferential thickness, tL is a radial thickness and tH is an axial thickness.

* * * * *